United States Patent
Knoerzer et al.

(10) Patent No.: US 6,746,743 B2
(45) Date of Patent: Jun. 8, 2004

(54) MULTI-LAYER FLEXIBLE PACKAGE WITH REMOVABLE SECTION

(75) Inventors: Anthony Robert Knoerzer, Plano, TX (US); Garrett William Kohl, Allen, TX (US); Steven Kenneth Tucker, Hurst, TX (US)

(73) Assignee: Frito-Lay North America, Inc., Plano, TX (US)

( * ) Notice: Subject to any disclaimer, the term of this patent is extended or adjusted under 35 U.S.C. 154(b) by 2 days.

(21) Appl. No.: 10/264,023

(22) Filed: Oct. 3, 2002

(65) Prior Publication Data

US 2004/0067326 A1 Apr. 8, 2004

(51) Int. Cl.[7] .............................. B32B 33/00; B32B 9/00
(52) U.S. Cl. .................... 428/42.1; 428/42.2; 428/42.3; 428/43; 428/34.1; 428/35.2; 428/35.7; 283/81; 283/72; 283/100; 283/101; 283/105; 206/459.1; 206/459.5; 206/831
(58) Field of Search .............................. 428/42.1, 42.2, 428/42.3, 43, 34.1, 34.8, 35.2, 35.4, 35.7, 36.6, 36.7; 283/81, 72, 100, 101, 103, 104, 105, 107, 108; 206/459.1, 459.5, 831

(56) References Cited

U.S. PATENT DOCUMENTS

| | | |
|---|---|---|
| 4,306,367 A | 12/1981 | Otto |
| 4,308,679 A | 1/1982 | Ray, et al. |
| 4,345,393 A | 8/1982 | Price et al. |
| 4,648,548 A | 3/1987 | Shin |
| 4,767,654 A | 8/1988 | Riggsbee |
| 4,993,845 A | 2/1991 | Faltynek |
| 5,021,274 A * | 6/1991 | Beck et al. ................ 428/40.5 |
| 5,127,743 A | 7/1992 | Miller et al. |
| 5,474,183 A | 12/1995 | Warren et al. |
| 5,484,167 A | 1/1996 | Donaldson et al. |
| 5,676,401 A | 10/1997 | Witkowski et al. |
| 6,041,929 A | 3/2000 | Brunner et al. |
| 6,047,488 A | 4/2000 | Tuszkiewicz |
| 6,068,181 A | 5/2000 | Cai |
| 6,251,450 B1 | 6/2001 | Giacoman |

* cited by examiner

*Primary Examiner*—Harold Pyon
*Assistant Examiner*—Michael C. Miggins
(74) *Attorney, Agent, or Firm*—Colin P. Cahoon; Carstens, Yee & Cahoon, L.L.P.

(57) ABSTRACT

A flexible container with a wall structure comprised of multi-layer, flexible thin films, including a first film layer that is affixed to the wall structure by a releasable adherence and that incorporates a removable promotional piece. The removable promotional piece is incorporated into the first film layer such that, other than a continuous cut facilitating removal and any conspicuous printing on the removable portion, it is indistinguishable from the rest of the exterior of the package. The continuous cut allows for full detachment of the removable portion from the first film layer so that only the releasable adherence prevents it from separating from the container. The promotional piece is removed by peeling it away from the container, where the peeling is facilitated by the action of the continuous cut and releasable adherence. The removable piece may function as a gaming piece or redeemable coupon, or may be designed to retain a tacky surface and function as a sticker.

12 Claims, 3 Drawing Sheets

MULTI-LAYER FLEXIBLE PACKAGE WITH REMOVABLE SECTION

BACKGROUND OF THE INVENTION

1. Technical Field

The present invention relates to a flexible bag or package with walls made up of multi-layer thin films. In particular, said bag comprises a section of at least one layer of said multi-layer film that can easily be removed without compromising the barrier properties of said bag.

2. Description of Related Art

Flexible bags are commonly used for packaging. For food packaging, in particular, flexible bags with walls made up of multi-layer flexible films and specific barrier properties are common for containing foods such as chips, popcorn, nuts, or cereals. It is also common for promotional devices to accompany all types of packaging, including paperboard, cardboard, and polymer and other flexible thin film packaging. Such devices may be incorporated into packaging any number of ways.

U.S. Pat. No. 4,345,393 ('393) is one of many examples in the prior art where promotional devices are incorporated into packaging. The '393 patent discloses a two-ply, erect, paperboard or cardboard carton. In a defined section of the outer ply of the carton, slits/perforations are cut to outline a desired size and shape such that the defined section may be torn along the slits/perforations and removed from the carton without disturbing the integrity of the rigid inner ply.

Another example of an invention where a promotional device is incorporated into packaging is U.S. Pat. No. 5,021,274 ('274). The '274 patent discloses a two-ply, erect, paperboard or cardboard container, including a corrugated inner ply and an outer ply incorporating a removable section outlined by a perforated die cut. The perforated die cut allows the removable section to be torn away from the package while leaving the corrugated inner ply intact.

Additionally, U.S. Pat. No. 5,484,167 discloses a label that is affixed to the outside of a package. The label includes a removable section that is integral to the label and, as with the '393 and '274 patents, is outlined by perforated cuts that facilitate its removal.

U.S. Pat. No. 4,648,548 discloses a container including decorative figures integral to the container that may be removed after the container is no longer being used as a container. The figures are outlined in the container walls and must be cut, punched, or torn out along perforated lines. The thickness of a figure is equal to the thickness of the wall of the container, such that removal of a figure causes a hole in the container wall.

U.S. Pat. No. 5,676,401 discloses a cylindrical metallic, glass, or plastic container with a label that covers the outside surface. On the outside of the label is product information, and on the inside of the label are temporary tattoos that are readily transferable from the label to the skin of a child.

U.S. Pat. Nos. 6,251,450 ('450) and 5,127,743 ('743) disclose food packages with walls comprised of multi-layer of flexible films wherein a promotional device is sealed between layers of the multi-layered package wall.

The '743 patent discloses a method of forming a package comprised of multi-layer flexible films wherein a promotional device is printed on the inside surface of one of the outer layers of the package. The promotional printed indicium is only partially visible from the outside of the package and is accessed by puncturing the outer layer of the package and separating the inner layer from the outer layer containing the hidden indicia. This separation is possible because no adhesive is applied between the portion of the outer layer containing the printed hidden indicia and the next innermost layer of the container.

As illustrated by the '450 and '743 patents, when promotional devices have been incorporated into flexible plastic bags composed of thin films in the prior art, the devices are not conveniently accessible to the consumer. The devices are generally either placed inside the bag along with the product, or embedded between the layers of the bag and sealed in place by an adhesive such that the bag must be cut, torn, or punctured in some way in order to gain access to the device. FIG. 1 is one example of this type of design and is a view of a cross-section of the wall of a package that incorporates a promotional device. The wall includes an outer layer 18 and an inner layer 20. Hidden printed indicia 24 are incorporated into the conventional printed layer 22, and both are printed on the inner facing side of the outer layer 18. The hidden printed indicia portion 24 consists of a series of printed ink layers 26, 28, 30, which includes a layer containing the promotional device 30, and printed layers 26, 28 that reveal the existence of the promotional device but obscure its exact nature when viewing from outside the package. The outer layer 18 is attached to the inner layer 20 by an adhesive layer 32. The adhesive layer 32, however, is not applied in the area where the hidden printed indicia portion 24 contacts the inner layer 20. When the outer layer 18 is cut or punctured to access the promotional device 24, this permits the portion of the outer layer 18 containing the device 24 to be separated from the inner layer 20 and viewed directly.

One problem with designs such as the '743 and '450 patents is that the cutting or tearing necessary to access the promotional device sacrifices the container's functional characteristics. The necessity of additional manufacturing steps is also a drawback of designs that place the promotional piece either inside the package or between the walls of the package. The additional steps greatly increase operating, material, and defect costs. Furthermore, if a promotional prize is inadvertently left out of a container, such process errors are likely to go undetected and have often ultimately lead to customer complaints.

As demonstrated by the '393 and '274 patents, promotional devices have also been incorporated into the walls of containers other than flexible bags, such as erect paperboard cartons or boxes. In some of these designs, the promotional device may be accessed without compromising the functional characteristics of the container. In others, however, removal of the device results in a hole in the container. FIG. 2 is an example of a container design wherein a promotional device is incorporated into the outer ply of a two-ply erect carton constructed from paperboard or cardboard. The integrity of the carton is not compromised upon accessing the device. In this embodiment, the outer ply 52 of the box is bonded to the inner ply by an adhesive layer 60. The promotional device is in the form of a detachable coupon 63 that is a portion of the outer ply 52. The coupon 63 is outlined by perforated slits 64 in the outer ply 52 that permit the coupon 63 to be removed by tearing along said perforated line 64. The coupon 63 portion of the outer ply 52 does not adhere to the inner ply because the inner side 66 of the outer ply 52 corresponding to the coupon 63 is coated with an adhesive-repelling agent. Employment of the adhesive-repelling agent and perforated tear outline 64 in combination permit the coupon 63 to be torn from the container.

One drawback of a design similar to the one illustrated by FIG. 2 is that perforated lines do not always tear cleanly, and as they are torn are prone to snagging and causing undesired tearing outside the perforated lines. Such unwanted tearing of the package or promotional device outside the perforated line may reduce the aesthetic value of any designs on the package or promotional device. In addition, depending on the type of promotional device, such unwanted tearing of the device may reduce its redeemable value and/or its value to a consumer.

Another less than ideal consequence of employing this design is the necessity of applying an adhesive repelling agent on the inside surface of the outer layer of the container, only in the area corresponding to the coupon. The added steps necessary to accurately apply the release agent increase process time, cost, and the likelihood of defects.

The designs of the '393 and '274 patents also require that the container be in the form of an erect carton assembled from paperboard or cardboard materials. They do not contemplate important improvements in packaging material technologies, such as use of polymeric, multilayered, flexible thin films. These newer materials are stronger and more flexible per unit of material than paper; paperboard, or cardboard-type packaging materials pertinent to the '393, '274 designs. Additionally, thin-film packaging materials, such as employed in packaging some snack foods, are orders of magnitude thinner and less bulky than their wood product counterparts. In many applications, these differences and improvements in dimensional and functional characteristics of packaging materials render the older wood-based materials useless. In addition, the drastic differences in physical characteristics between flexible thin films and wood-based packaging materials present drastically different processing problems, and require significant development to optimize effective thin film packaging.

Therefore, what is needed is an improved container with enhanced barrier characteristics due to its construction from polymeric multi-layer flexible films, and having an easily removable promotional device that minimizes costs and manufacturing steps. The device should be easily accessible to the consumer and its removal from the package should not result in damage to the device itself or the package. Furthermore, removal of the device should not compromise the advanced barrier characteristics of the package.

SUMMARY OF THE INVENTION

The proposed invention comprises a flexible container formed from multi-layer thin films that incorporates a promotional piece, defined by a continuous cut, into the outermost layer of the container. The adherence of the outermost layer to the next outermost layer of the package is such that the continuous cut in said outermost layer, outlining the size and shape of the promotional piece, permits the piece to be easily removed from the container by peeling it away. Additionally, removal of the promotional piece does not compromise the functional characteristics, such as barrier properties, of the container. The design is such that, upon removal, the piece may or may not retain a tacky surface and may take on any number of forms such as that of a redeemable coupon, gaming piece, trading card, sticker, decorative item, etc. Further, in one embodiment of the invention, the container retains minimum required barrier properties after removal of the promotional piece.

BRIEF DESCRIPTION OF THE DRAWINGS

The novel features believed characteristic of the invention are set forth in the appended claims. The invention itself, however, as well as the preferred mode of use, and further objectives and advantages thereof, will be best understood when described in conjunction with the following illustrative embodiments wherein:

DETAILED DESCRIPTION

Figure 1:
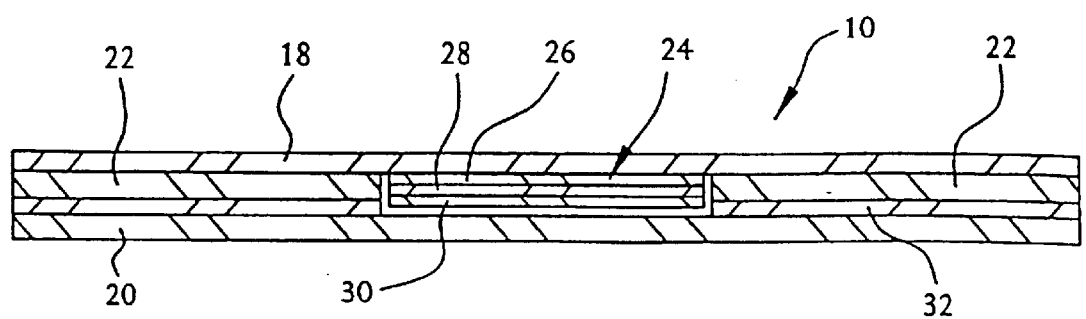
FIG. 1 is an illustration of a cross-section of a multi-layer container of the prior art wherein a promotional piece is incorporated between the layers of the wall of the container.
Figure 2:
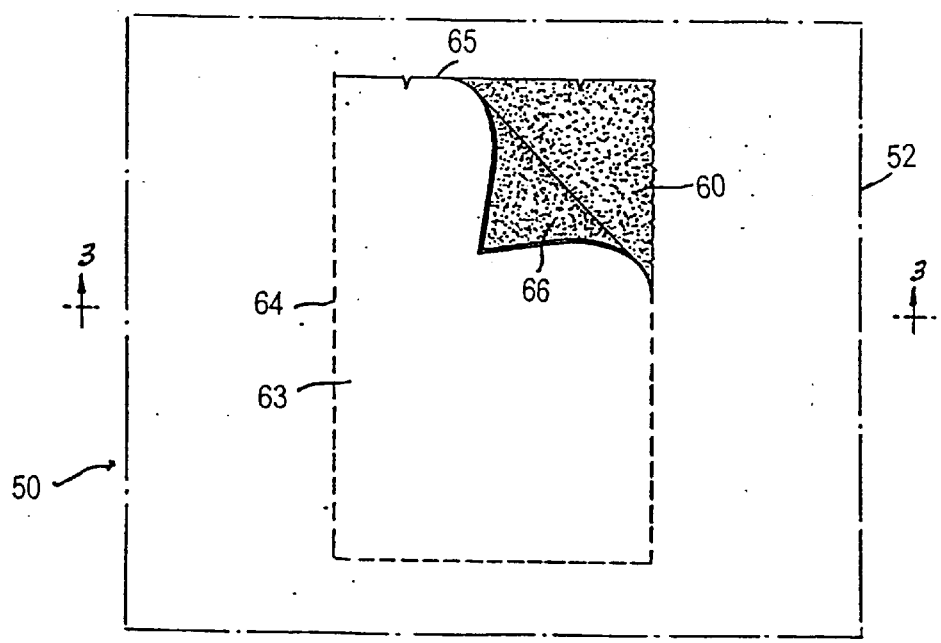
FIG. 2 is an illustration of a container of the prior art wherein a portion of the outer layer of the container is designated as a removable coupon and defined by a perforated tear outline.
Figure 3:
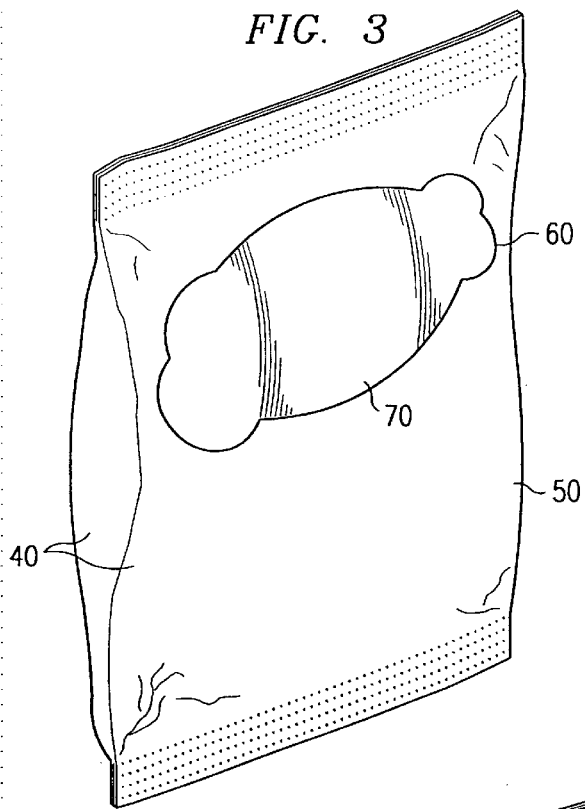
FIG. 3 is a perspective view of an embodiment of the present invention wherein a removable promotional piece is designed into the outer layer of a container and is outlined by a continuous cut.
Figure 4:
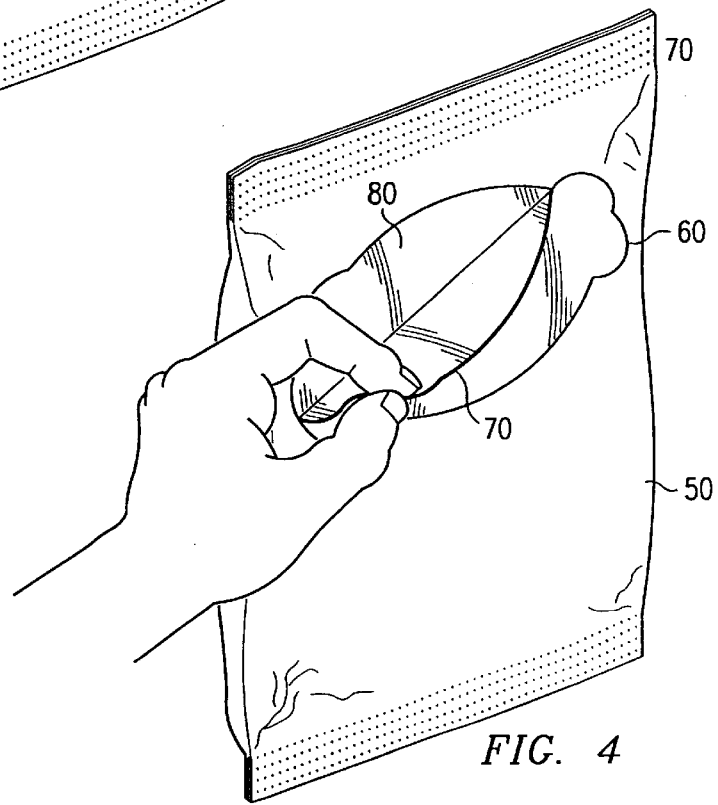
FIG. 4 is a perspective view of an embodiment of the present invention wherein a portion of the outermost layer of the container, outlined by a continuous cut, is used as a promotional piece and is shown partially peeled away from the container.

FIGS. 3 and 4 illustrate a container in accordance with an embodiment of the present invention. The container wall structure 40 includes at least two film layers. A continuous cut 60 in the first film 50 of the container defines a removable portion or piece 70 of said first film 50. The continuous cut 60 defines the size and shape of the removable portion 70 and is of a depth greater than the thickness of the first film layer 50, but such that the portion's 70 removal does not compromise the barrier and other functional characteristics of the container.

Prior to executing the continuous cut 60, the first film layer 50 of the container is adhered to the second film layer 80 of the container by a releasable adherence. The continuous cut 60 is continuous such that if the first film layer 50 were not adhered to the second film layer 80 of the container, said removable portion 70 would not remain affixed to the container. The releasable adherence allows the first film layer 50 to be easily peeled away from the second film layer 80 at any cross-section of the bag's wall. Thus, the releasable adherence affixes the container's first film layer 50, including the removable portion 70, to the second film layer 80. At the same time, the releasable adherence permits said removable portion 70 to be easily peeled away from the container, allowing the removable portion 70 to function as a promotional piece, such as a sticker that can be affixed to another surface.

The cutting tool that executes the continuous cut 60 leaves an unbroken line where the edge of the removable section 70 meets the edge of the surrounding, first film layer 50 of the container. The removable section 70 forming the promotional piece is separated from the container by easily manipulating the container in the area of the continuous cut 60. As demonstrated by FIG. 4, if properly flexed in the area of the cut 60, the edge of the removable section 70 lifts away from the container such that a consumer can then seize the edge and easily peel the removable portion 70 completely away from the container.

The material that forms the first film layer 50 of the bag typically also serves as the product label and may contain printed information and/or decorative designs that identify the product and provide nutritional and other information about the product. The removable section 70 of the present invention is also incorporated into the first bag layer 50 and, therefore, the printing, pictures, and/or designs identifying and explaining the promotional piece are included among the printing, pictures, and/or designs that decorate the bag and identify the product enclosed. In this way, the printing on the removable portion 70 of the first film layer 50 of the bag may, in addition to the continuous cut 60, further identify the existence and location of the promotional piece because it interrupts, and is eye-catching amid, the rest of the printing on the bag. Other than the continuous cut 60 defining the removable section 70 and any conspicuous print on said removable section 70, the promotional piece is indistinguishable from the rest of the first film layer 50 of the container.

The promotional piece 70 may take on a number of forms. For example, the promotional piece may be a sticker, trading card, redeemable coupon, or any sort of game piece. In addition, the theme and character of the promotional piece may be printed on the outside or inside of the removable portion, on the package underneath the removable portion, or any combination of the three.

In a preferred embodiment, the container of the present invention is a flexible food bag with walls formed from webs of multi-layer flexible thin films. The flexible thin films are of the type commonly employed in the art to produce flexible bags using a typical vertical form, fill, and seal packaging machine, and are typically constructed of thin film layers of LIP to about 150 gauge thickness (1.5 mils or 0.0015 inches). The desired product environment to be maintained within a package drives the types and arrangements of thin films that are chosen for a particular packaging application. Other considerations include desired shelf life, and cost. A plurality of package designs are possible, depending on the preceding factors. The materials making up the film layers, primarily plastics, are well known in the art. Examples of such materials are various vinyl, metalized, and polymer extrusion films, and various adhesives, ties, and bonding agents for fixing the thin film layers together. These materials vary in cost, as well as in their physical characteristics, such as flexibility, strength, and permeability to substances that decrease the shelf life of a food product, such as oxygen, moisture, and light.

Prior to forming a bag, the film layers that make up the flexible thin films are first laminated together in the desired arrangement. The cutting or scoring, such as with a die or laser cutting tool, that defines the removable portion in what will be the outer layer of the bag also occurs prior to formation of the bag. The scoring may occur during the lamination step as a part of the conversion operation, or as an entirely separate step between lamination and bag formation. Therefore, once the flexible thin films that form the container of the present invention reach the bag formation step, bag formation is the only remaining operation. That is, the flexible thin film layers and thin films are already bonded together in the desired arrangement with any incorporated decorations, such as ink printing or removable promotional pieces, already in place.

Figure 5:
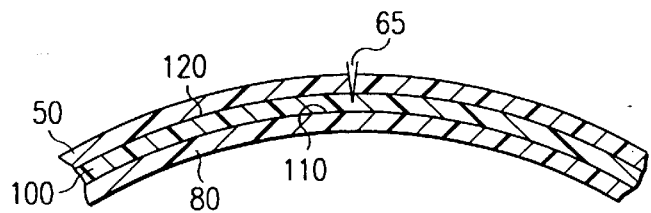
FIG. 5 is a cross-sectional view of one embodiment of the present invention wherein the cut is illustrated penetrating through the container's outermost layer and terminating at a depth within the adhesive layer.

FIG. 5 is a cross-sectional view of one preferred embodiment of a wall of a food container in accordance with the present invention. Among the films that make up the wall of the bag is a first polymer film layer 50 adhered to the second film layer 80 of the bag such that the adherence is releasable. In one preferred embodiment, the first film layer 50 is comprised of a polypropylene, polyethylene, or derivative thereof, and the second film layer 80 is comprised of a polymer or metallized polymer of the same type as the first film layer 50. The first film layer 50 and second film layer 80 are separated by an adhesive layer 100 that bonds them together. For illustrative purposes, the cut 65 in the cross-sectional view of FIG. 5 corresponds to the continuous cut 60 of FIGS. 3 and 4 that defines the size and shape of the removable section 70.

One key consideration of the present invention is maintenance of the container's barrier characteristics. A flexible thin film container's design may vary depending on the type of food being preserved. For instance, the type of food involved determines the desired moisture and oxygen levels inside the container, which along with desired shelf life determines the types and arrangement of flexible thin films employed. Just as the bag design, which is the type and arrangement of films, may be adjusted to account for different foods, it may also be adjusted to account for the removal of a section of the first film layer 50, which contributes to the container's barrier characteristics. First, the continuous cut 65 is controlled so that its penetration is only through the first film layer 50 and terminates at a depth within the thickness of the adhesive layer 100. This controlled penetration of the cutting tool, such as a die or laser cutting tool, prior to detachment of the removable portion 73, does not significantly alter the container's barrier properties. This is because the second film layer 80, and any other layers on the product side of the container wall, are not affected by the cut 65. Also, prior to detachment of the removable portion 73, the continuous cut 65 does not drastically reduce the coverage of the removable portion 73 or the adhesive layer 100 in the area of the cut 65. Second, the number, types, arrangement, and thickness of film layers beneath the first film layer 50, including the thickness of the moisture-blocking adhesive layer 100, may be adjusted to account for any reduction in barrier capacity resulting from detachment of the promotional piece. Considering that multiple pieces may be incorporated into one package, and the plurality of possible shapes and sizes of pieces, this second factor is especially important in the case where the surface area of the piece is a significant percentage of the total surface area of the package's first film layer 50.

Figure 6:
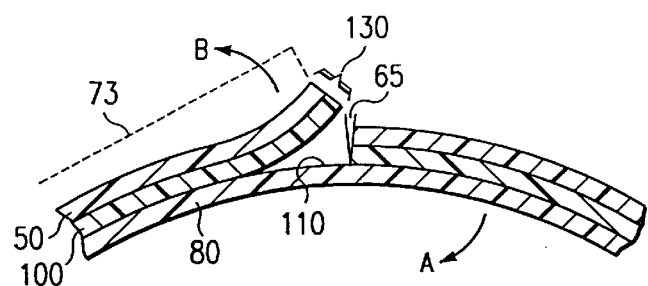
FIG. 6 is a cross-sectional view of one embodiment of the present invention in the area of the cut wherein separation of the layers by peeling at the cut occurs between the adhesive layer and second outermost layer.

In another preferred embodiment, illustrated by FIG. 6, the promotional piece takes the form of a sticker. The first film layer 50, comprised of either polypropylene (PP) or polyethylene terephthalate (PET), is bonded to the second film layer 80, also a form of either PP or PET, or metallized PP or PET, by an adhesive layer 100, which in this embodiment is a pressure sensitive adhesive (PSA). A release agent is applied at the interface 110 between the adhesive layer 100 and second film layer 80. The releasable adherence occurs at the interface 110 where the release agent is applied. The adherence is releasable in that the action of the release agent prevents the adhesive 100 from permanently locking the first film layer 50 to the second film layer 80. Without the action of the release agent, the adherence would not release at the interface 110, and the adhesive 100 would prevent the removable portion 73 from being peeled away from the second film layer 80. The releasable adherence and the force of slightly bending the wall of the container in the appropriate direction A in the area of the cut 65 causes an edge 130 of the removable portion 73 to release and lift away from the container. A consumer may then peel the removable portion 73 away from the container by seizing the exposed edge 130 and pulling in the direction B. As a consumer peels away the removable portion 73 at the cut 65 in order to access the promotional piece, the action of the release agent at the interface 110 also permits at least a portion of the adhesive layer 100 to peel away from the container and remain adhered to the removable portion 73. In this way, after the removable portion 73 is peeled away, the portion of the adhesive layer 100 that remains affixed to the removable portion 73 retains its tacky quality and allows the removable portion 73 to function as a sticker.

Figure 7:
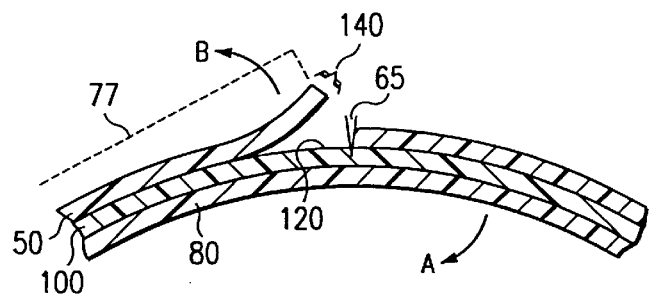
FIG. 7 is a cross-sectional view of one embodiment of the present invention in the area of the cut wherein separation of the layer by peeling at the cut occurs between the outermost layer and adhesive layer.

In yet another preferred embodiment, illustrated by FIG. 7, the first PP or PET film layer 50, is again bonded to the second PP, PET, or metallized OPP or PET film layer 80 by an adhesive layer 100. However, in contrast to the embodiment illustrated by FIG. 6, in FIG. 7 the release agent resulting in a releasable adherence is applied to the interface 120 between the first film layer 50 and adhesive layer 100. The releasable adherence at the interface 120 prevents the first film layer 50 from permanently locking to the adhesive 100. Consequently, in this embodiment, when the removable portion 77 is peeled away from the container, the adhesive layer 100 remains locked to the second film layer 80, and the releasable adherence allows the removable portion 77 to be separated from the adhesive layer 100 without retaining a tacky surface. The releasable adherence at the interface 120, and bending the wall of the container in the appropriate direction A in the area of the cut 65, causes an edge 140 of the removable portion 77 to release and lift away from the container. A consumer may then peel the removable portion 77, i.e., the promotional piece, away from the container by seizing the exposed edge 140 and pulling in the direction B. Once the removable portion 77 is peeled away, the adhesive layer 100 and release interface 120 remain exposed.

Among the advantages of the present invention, eliminating the need for any tearing along the edges of the removable section as said section is separated from the container, and any tearing or puncturing of the container at all, reduces the risk of damaging the promotional piece and/or container. In addition, building the promotional piece into the outer layer of the container lowers material and processing costs compared with designs employing a promotional piece that is inside the container or between container walls. Also, by designing the container so that the releasable adherence is consistent across the surface of the container, a plurality of promotional pieces may be incorporated into the container by simply adding additional cuts of any size or shape. The need to accurately place the releasable adherence function in a particular location or locations on the surface of the container is eliminated.

While the invention has been particularly shown and described with reference to a preferred embodiment, it will be understood by those skilled in the art that various changes in form and detail may be made therein without departing from the spirit and scope of the invention.

What is claimed is:

1. A flexible container having oxygen and moisture vapor barrier properties and incorporated promotional piece comprising:

a container wall structure having at least two thin film layers, wherein a first thin film layer is affixed to a second thin film layer by a releasable adherence, wherein said first thin film layer is releasable at any cross-section of the container, wherein said first thin film layer comprises a continuous cut; and wherein said first film comprises at least one removable portion comprising said promotional piece, wherein said removable portion possesses a size and shape defined by the continuous cut, wherein said continuous cut and said releasable adherence facilitate removal of said removable portion, and wherein removal of said removable portion does not compromise the barrier properties of the container.

2. The container of claim 1 wherein the container is a food container.

3. The container of claim 1 wherein said removable portion is a sticker.

4. The container of claim 1 wherein said first thin film layer is a polymer film layer.

5. A container having oxygen and moisture vapor barrier properties constructed of multi-layer flexible thin films and an incorporated promotional piece comprising:

a first film layer and a second film layer affixed to said first film layer by a releasable adherence wherein said first thin film layer is releasable at any cross-section of the container, wherein said first thin film layer comprises a continuous cut; and wherein said first film comprises at least one removable portion comprising said promotional piece, wherein said removable portion possesses a size and shape defined by the continuous cut, wherein said continuous cut and said releasable adherence facilitate removal of said removable portion, and wherein removal of said removable portion does not compromise the barrier properties of the container.

6. The container of claim 5 wherein the container is a food container.

7. The container of claim 5 wherein said removable portion is a sticker.

8. The container of claim 5 wherein said first film layer is a polymer film layer.

9. A method of incorporating a promotional piece into the container according to claims 1 or 5 constructed from multi-layer flexible thin films comprising the steps of:

affixing a first film layer to a second film layer by a releasable adherence;

scoring, thereby defining, a removable portion of said first film layer; and forming a container with a wall structure having at least said first film layer and said second film layer.

10. The method of claim 9 wherein said container is a food container.

11. The method of claim 9 wherein said removable portion is a sticker.

12. The method of claim 9 wherein said first film layer is a polymer film layer.

* * * * *